United States Patent [19]
Pitts

[11] 3,732,665

[45] May 15, 1973

[54] PACKAGING APPARATUS FOR PACKAGING CONTINUOUS PRODUCTION OF A DISCRETE PRODUCT IN PREDETERMINED QUANTITIES

[76] Inventor: Robert W. Pitts, 7710 Barbenton, Houston, Tex.

[22] Filed: Mar. 23, 1971

[21] Appl. No.: 127,309

[52] U.S. Cl. ...........................53/62, 53/78, 53/189, 53/258
[51] Int. Cl. .........................................B65b 57/10
[58] Field of Search.....................53/62, 78, 189, 258

[56] References Cited

UNITED STATES PATENTS

| | | | |
|---|---|---|---|
| 3,513,623 | 5/1970 | Pearson | 53/252 X |
| 3,594,981 | 7/1971 | Pitts | 53/189 X |
| 3,435,584 | 4/1969 | Prechter | 53/62 |
| 3,556,316 | 1/1971 | Marasso et al | 53/189 X |

Primary Examiner—Travis S. McGehee
Attorney—Donald Gunn

[57] ABSTRACT

A packaging machine which incorporates a tray or trough which feeds continuous production of a discrete item to one of a pair of reciprocating trays, there being a gate and counter mechanism for determining the number of products on the reciprocating trays, one of the trays being loaded at a time. The gate closes to cut off additional products for one of the two trays which is then indexed to an out-of-the-way position to thereafter permit the counting and accumulation of products on the other of the two trays. For the tray which is indexed to the side, a ram mechanism drives all of the products off of the tray through a set of stuffing horns into an open container or bag. The machine includes a pair of bag openers which preferably cooperate with two stacks of closed bags. The topmost bag on each stack is opened. The ram drives the product into the open bag on one of the two stacks, and the filled bag is kicked from the table.

13 Claims, 10 Drawing Figures

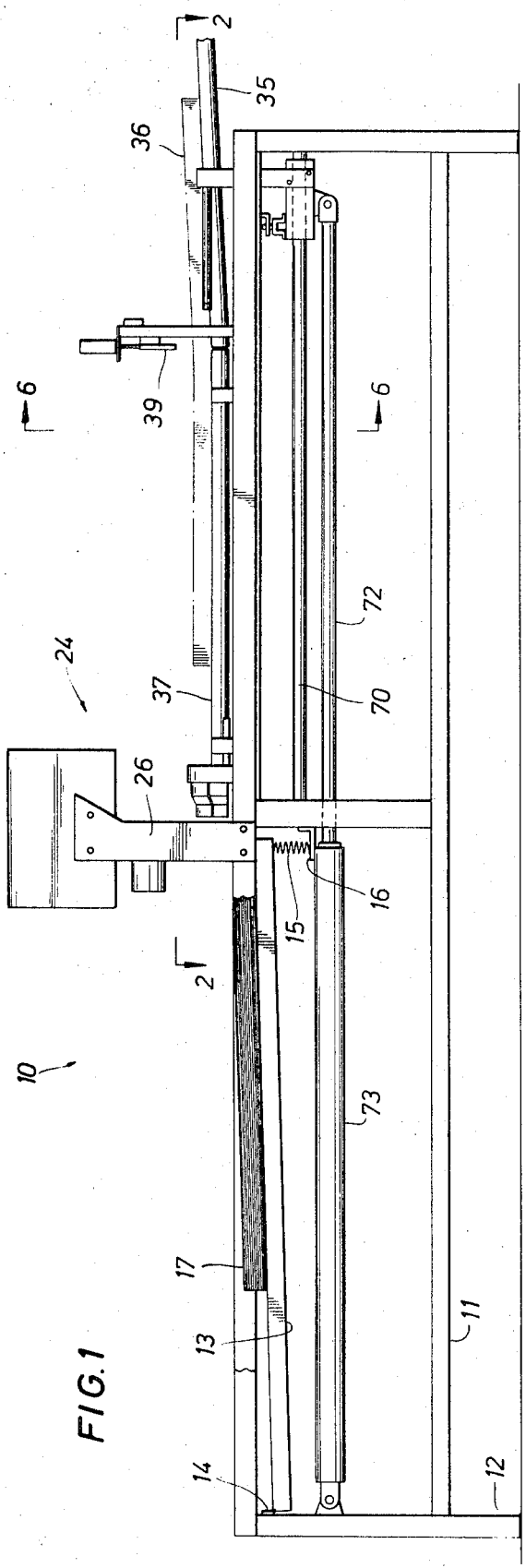
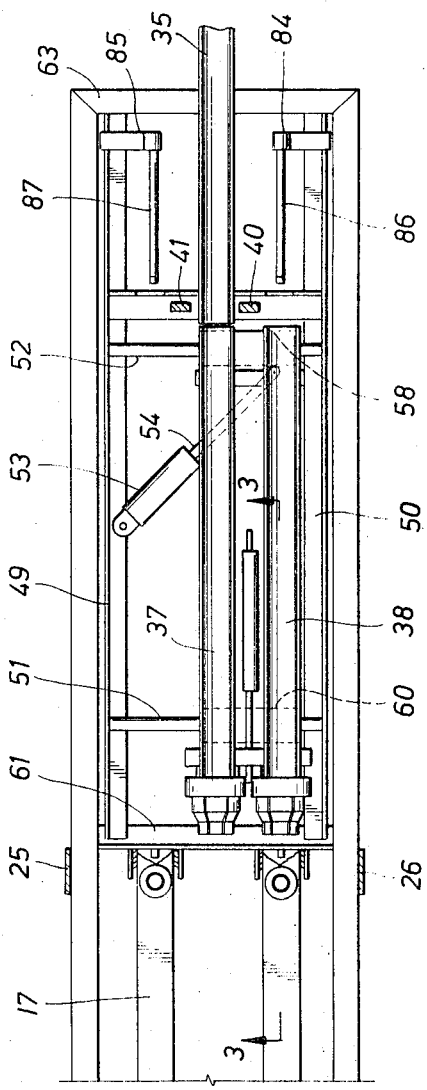
FIG.1
FIG.2
Robert W. Pitts
INVENTOR
BY Donald Gunn
ATTORNEY Robert W. Pitts
INVENTOR BY   Donald Gunn

ATTORNEY

PATENTED MAY 15 1973 3,732,665

Robert W. Pitts
INVENTOR

BY Donald Gunn

ATTORNEY

Robert W. Pitts
INVENTOR

BY Donald Gunn

ATTORNEY

Robert W. Pitts
INVENTOR

BY Donald Gunn

ATTORNEY

PACKAGING APPARATUS FOR PACKAGING CONTINUOUS PRODUCTION OF A DISCRETE PRODUCT IN PREDETERMINED QUANTITIES

RELATED APPLICATIONS

Applicants have no presently pending related applications.

SUMMARY OF PROBLEM AND SOLUTION

In many manufacturing situations, a product is manufactured continuously and output by the basic machine which produces it. The manufacture of such a product is of no concern to the present disclosure, but it is noted as creating a problem in the packaging of the finished product. Of particular interest to the present invention is the packaging of a product which is produced in quantity and which is generally uniform in size and shape. By way of example, apparatus of the present invention particularly finds use and application in packaging lids for containers such as the metallic lids used to close soft drink and beverage containers. The packaging machinery is particularly adapted for this application, but also finds application for other manufactured products of generally uniform size and different thicknesses. The packaging machine may be used with devices which are triangular or rectangular in shape, as well as those which are circular in cross section.

Consequently, the packaging apparatus of the present invention is summarized as providing a packaging apparatus constructed on a substantial framework which has a pair of stacks of closed containers such as polyethylene film bags or kraft paper containers which are folded at a pleat and stacked one on the other. A pair of adjacent stacks of closed bags is located beneath a bag opening mechanism having a pair of bag openers. The bag openers reciprocate away from the stack of closed bags to pull open the topmost bags. At the opposite end of the machine, a trough delivers the product to be packaged. The trough passes through a gate and counter mechanism which delivers the requisite number of items to be packaged, measuring by unit or length. The gate periodically closes to separate the quantity of items to be packaged. On the opposite side of the gate, and in alignment with the trough, is one of a pair of trays which accumulates the quantity of items to be packaged. The pair of trays is indexed to the right and left so that first one tray and then the other is filled. When one tray is filled, it indexes to position the empty tray in line with the gate and trough to continue filling on the empty tray. In the meantime, a plunger or ram mechanism drives home the product on the filled tray through a set of stuffing horns and into the bag to be filled. The bag is in the open position through operation of the bag opening apparatus.

While the foregoing summarizes the present invention, the preferred embodiment is illustrated in the several figures which should be considered in conjunction with the written specification to ascertain many objects and advantages of the present invention. The drawings are:

FIG. 1 is a side view of the packaging machine of the present invention shown cooperative with a trough for feeding the product to be packaged and a stack of closed bags;

FIG. 2 is a sectional view taken along the line 2 — 2 of FIG. 1, showing a reciprocating table which includes a pair of loaded trays positioned between the feed trough and the open bag;

Figure 3:
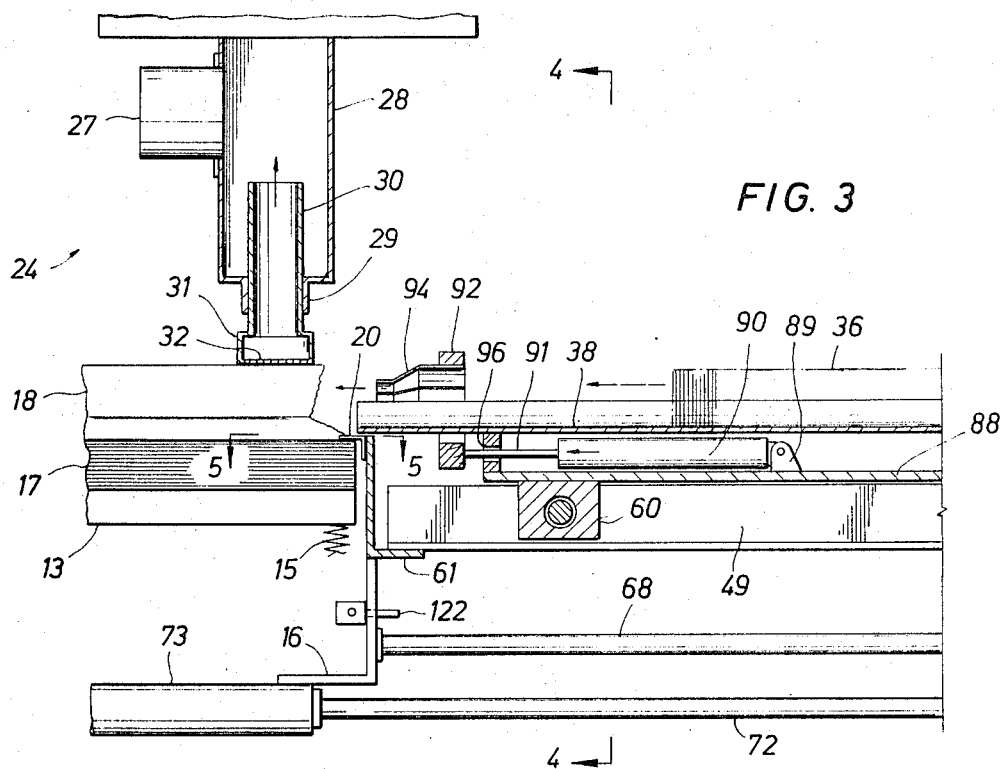
FIG. 3 is a sectional view taken along the line 3 — 3 of FIG. 2 showing an enlarged view of the bag opening mechanism and the stuffing horn mechanism which assists in inserting the products to be packaged into the open bags.

In the drawings, attention is first directed to FIG. 1 which illustrates a packaging machine in accordance with the present invention. The packaging machine is indicated by the numeral 10. The packaging machine incorporates a rectangular framework 11 having a number of legs 12 and parallel side pieces for support of the packaging machinery proper. The bag handling portion of the machine will be first described and is located at the left hand portions of FIG. 1.

A bag table 13 is mounted at a hinge 14 at the left hand end of the table for movement upward in response to the urging of a spring 15 at the right hand end. The spring 15 rests on a transversely extending bracket 16. The spring 15 forces the table 13 upwardly to position the topmost bag at a proper elevation for the bag opening machinery. The stack of bags is indicated by the numeral 17 while the open bags are indicated by the numeral 18 as is best illustrated in FIG. 3.

As best shown in FIG. 3, the spring 15 urges the entire pivotally mounted apparatus, including the bag table 13, upwardly against a stop member 20. The stop 20 protrudes out over the stack of bags. Preferably in manufacture, the bags are formed together in a group of perhaps one hundred to five hundred bags, depending on the thickness of the film or paper, and are folded at side pleats to stack neatly. The bags are preferably formed with upper and lower lips with the lower lip protruding further to the right in FIG. 3 than the upper lip. This permits the upper lip to clear the tab 20 while the lower lip is caught beneath the tab 20. Thus, the open bag 18 shown in FIG. 3 is held in position by the tab 20. As the supply of bags is exhausted, the stack is shortened, but still the uppermost bag is held at its lower lip by the tab 20 while the upper lip is free to be opened in a manner to be described hereinafter.

Figure 5:
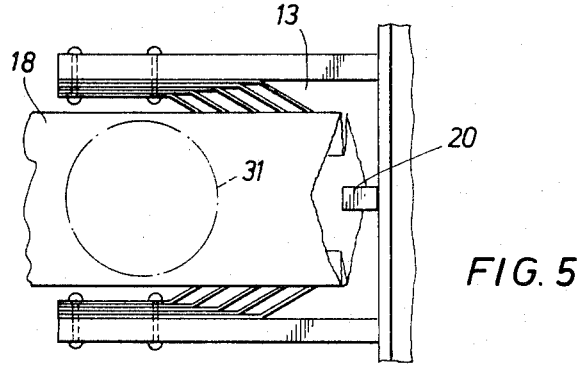
FIG. 5 is a sectional view taken along the line 5 — 5 showing a view from above of the topmost bag which is opened.

Attention is momentarily directed to FIG. 5 of the drawings which is a top view of the open bag 18 carried on the bag table 13. In FIG. 5, the lower lip is shown beneath the tab 20 which releasably holds the bag until it is filled and removed from the bag table 13 in a manner to be described. The upper lip is shown somewhat shorter than the lower lip to avoid being caught beneath the tab 20.

Figure 4:
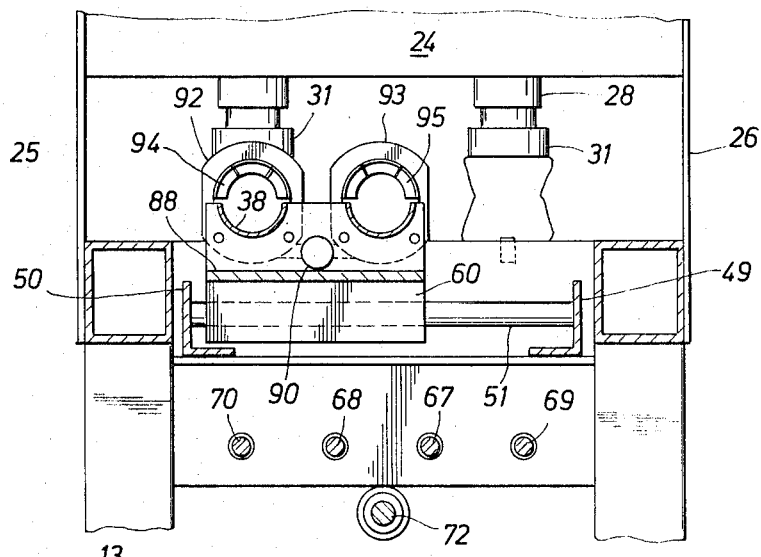
FIG. 4 is a sectional view taken along the line 4 — 4 of FIG. 3 in enlarged scale showing the reciprocating table which carries the pair of loading trays to the left and to the right for cooperation with the dual bag opening means of the present invention.

Returning to FIG. 1 of the drawings, the numeral 24 generally indicates the bag opening mechanism of the present invention. The bag opening means 24 is located above the bag table 13 near the open end of the elongate bags. As best shown in FIG. 4, the bag opening means is supported by the vertical plate members 25 and 26 at the opposite sides of the apparatus.

The bag opening means 24 is perhaps best understood by reference to FIGS. 3 and 4 together. Briefly, the numeral 27 indicates a nozzle which is adapted to be connected with a vacuum pump. A flexible hose is preferably connected to the nozzle 27. The nozzle 27 is connected with a tubular cylinder 28. The connection between the nozzle 27 and the cylinder 28 is preferably leak-proof. The upper end of the cylinder is closed, but is generally supported by the overhead structure. The cylinder 28 is positioned above one of the two bag stacks in the mechanism. The cylinder 28 includes a lower opening which is defined by a skirt 29 which is downwardly directed and circular in cross section. A relatively light weight, hollow, tubular member 30 is fitted in the skirt 29. The skirt 29 is of sufficient length to guide a tubular member 30 upwardly and downwardly. The tubular member 30 has at its lower end an enlarged vacuum shoe 31. It is enlarged sufficiently to prevent the tubular member 30 from being drawn within the cylinder 28. This determines the top of the stroke. The vacuum shoe 31 has a number of openings at 32 on its bottom face. The openings are spaced on some pattern across the face to define a relatively large cross sectional area of opening in the aggregate. The opening is sufficient to draw a measurable quantity of air into the tubular member 30 and then into the cylinder 28. Of course, the air is evacuated relatively fast. While the degree of vacuum need not be great, a representative range might be a pressure drop of one to two pounds per square inch within the cylinder 28.

Of some importance is the inclusion of a measure of clearance between the skirt 29 and the outer face of the cylinder or tubular member 30. The clearance is in the range of perhaps two mils to about eight or ten mils at a maximum. The clearance is preferably intentional for a number of reasons. First, it aids in the manufacture of the device inasmuch as close tolerances are not required. It permits the two members to fit relatively easily together for ease of movement. It defines a vacuum leakage path which assists in reciprocating movement of the tubular member 30 and the vacuum shoe 31 carried at its lower end.

The vacuum shoe 31 functions somewhat in the following manner. When it is in the up position and not engaged with a bag, there is a substantial amount of intended leakage in the up position. A substantial amount of air passes through the openings 32. An additional quantity of air passes through the slot between the cylinder or tubular member 30 and the skirt 29. While the vacuum flow tends to hold the shoe 31 up, its weight is sufficient to cause it to fall by gravity. When it falls to the stack of bags indicated by the numeral 17 as shown in FIG. 3, the top bag closes the ports or openings 32. This cuts the relative cross sectional area for leakage of air. As the air is continuously drawn from the cylinder 28, a pressure differential acts on the cross sectional area of the tubular member 30 to lift it. It lifts quite rapidly, depending on the vacuum flow and the amount of leakage. As the vacuum shoe 31 rises, it carries the wall of paper which closes the ports 32. This opens the topmost bag 18 and prepares it for filling with the product in the manner to be described hereinafter.

The bag opening mechanism 24 is quite rapid in operation. With the use of the bag opening mechanism 24, bags can be opened at a rate of perhaps 20 to 40 bags per minute. This depends on the distance that the vacuum shoe 31 must fall, and a number of other practical design parameters.

Attention is next directed to FIG. 4 of the drawings which shows the bag opening apparatus duplicated on two sides of the equipment. Two stacks of closed bags are provided on the bag table 13 as previously mentioned. Each stack is located beneath its own individual bag opener. Each stack is equipped with a separate table 13, hinge 14, and spring 15. Each stack is likewise equipped with its own tab 20. While it might be preferable for convenience in reloading that both stacks be exhausted simultaneously, they function independently of one another, and hence, one table or bag tray 13 can be completely filled while the other is completely empty.

Returning to FIG. 1 of the drawings, the numeral 35 identifies a feed trough for the product to be packaged. The numeral 36 indicates the product on the trough 35. The precise dimensions and cross sectional shape of the trough 35 are clearly subject to variation inasmuch as the product 36 may vary. The apparatus to be described is particularly useful for the packaging of can lids such as those found on beverage containers. However, it finds use and acceptance with other items which are generally of uniform shape. Thus, the packaging apparatus of FIG. 1, while not useful for granular products, viscous liquids, and so on, does find use with items of a generally consistent size and shape.

The trough 35 extends from the source of the product to be packaged. It is presumed that the product 36 is supplied somewhat continuously. The trough 35 feeds into the machine as best shown in FIG. 2. Eventually the trough 35 terminates at one of a pair of trays 37 and 38 as best shown in FIG. 2. A gate 39 is positioned just at the end of the trough 35. While a space is shown in FIGS. 1 and 2 between the trough 35 and the appropriately positioned tray, preferably the space is less than the width of the product being handled to prevent the product from falling through the slot therebetween. The gate 39 moves into the space between the trough 35 and the adjacent tray when it closes. More will be noted concerning the gate 39 hereinafter.

Figure 6:
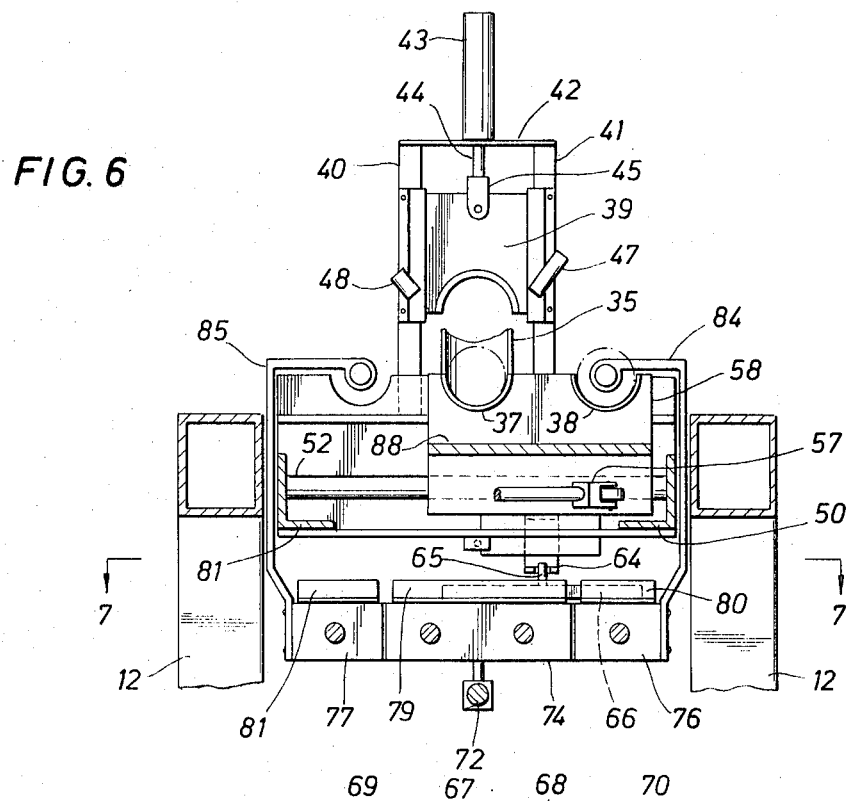
FIG. 6 is a sectional view taken along the line 6 — 6 of FIG. 1 showing in enlarged scale the gate and counter mechanism positioned for counting a predetermined quantity of items to be packaged from the feed trough and showing details of the mechanism which rams the product to be packaged into an open bag.

The gate 39 is mounted on a pair of upright members 40 and 41 as shown in sectional view in FIG. 2. An enlarged view of the gate 39 is found in FIG. 6. In FIG. 6, the upright members 40 and 41 support a transversely extending plate 42 which serves as a support for a hydraulic cylinder 43. The cylinder 43 has a piston rod 44 connected with a clevis 45 which supports the gate 39. It will be noted that the lower edge of the gate 39 is arcuately shaped. This is under the presumption that a circular object is being packaged. The arc of curvature is such that the gate 39 in its lowermost position is located at least to some extent between a pair of adjacent products to be packaged, and hence, temporarily blocks the trough 35 to continued feeding of the product. Of course, the blockage is for a relatively short time, and the gate 39 is quickly retracted just as fast as the empty tray is positioned opposite the gate 39. It will be recognized that the gate 39 is used to interrupt the feeding of product onto a tray inasmuch as the tray is loaded, and will hold the feeding of additional product while the loaded tray is moved aside and the empty tray is positioned opposite the trough 35.

In FIG. 6, the numeral 47 indicates a light or lamp, and the numeral 48 indicates a photocell. Since the item to be packaged has a shiny or reflective surface, counting is achieved through the reflection of the beam of light to the photocell 48. When the beam of light falls between a pair of products to be counted, no reflection occurs. When it passes over a product, the reflected beam peaks at the photocell 48 to provide an output pulse. More will be noted concerning the counter circuitry hereinafter.

In FIG. 2, the loading trays 37 and 38 are shown on a single table. The framework 11 includes a pair of rails 49 and 50 located on opposite sides of the equipment. The space between the rails 49 and 50 is open. Transversely extending support bars 51 and 52 are located beneath the loading trays 37 and 38. The bars 51 and 52 are approximately at opposite ends of the trays. The entire mechanism, including the trays 37 and 38, indexes laterally to and fro on the bars 51 and 52. A motive force is provided by means of a double acting hydraulic cylinder 53 which is a piston rod 54. The piston rod 54 is likewise shown in FIG. 6 connected to a clevis 57 which is pivotally connected to a protruding ear or tab in an end plate 58 which supports the pair of trays 37 and 38. Briefly, the plate 58 carries an opening for receiving the tubular guide bar 52. Thus, as viewed in FIG. 6, the plate 58 can reciprocate left and right and carry with it the trays 37 and 38. It is guided in this movement by the bar 52. As shown in dotted line in FIG. 2, a similar plate 60 and guide bar is located at the left hand end of the indexing mechanism.

In summation, a generally rectangular framework including the trays 37, 38, and end plates 58 and 60 is defined. The framework is rigidly constructed and is movable as a unit between the two positions defined. As viewed in FIG. 2, one position is achieved when the tray 37 is in alignment centrally of the equipment with the trough 35. The other position is achieved when the tray 38 is aligned with the trough 35. The hydraulic cylinder 53 is the means providing the movement from one indexed position to the other.

In FIG. 2, it will be noted that the rails 49 and 50 are welded at their left hand ends to a transversely extending L-shaped member 61. They are joined at the right hand end by welding or other suitable means to a frame member 63 which is at the extreme right hand end of the framework. As more specifically shown in FIG. 6, a a slot is defined between the rails 49 and 50 and the adjacent framing structure, including the legs 12. It should be noted that the guide bar 52 does not extend into the slot, but is located inboard of the rails 49 and 50. This slot is quite lengthy as best shown in FIG. 2. The slot extends from behind the gate 39 to a point coextensive with the stuffing horns, as will be described hereinafter. This slot permits access for a reciprocating mechanism which rams home the product to be described.

Figure 7:
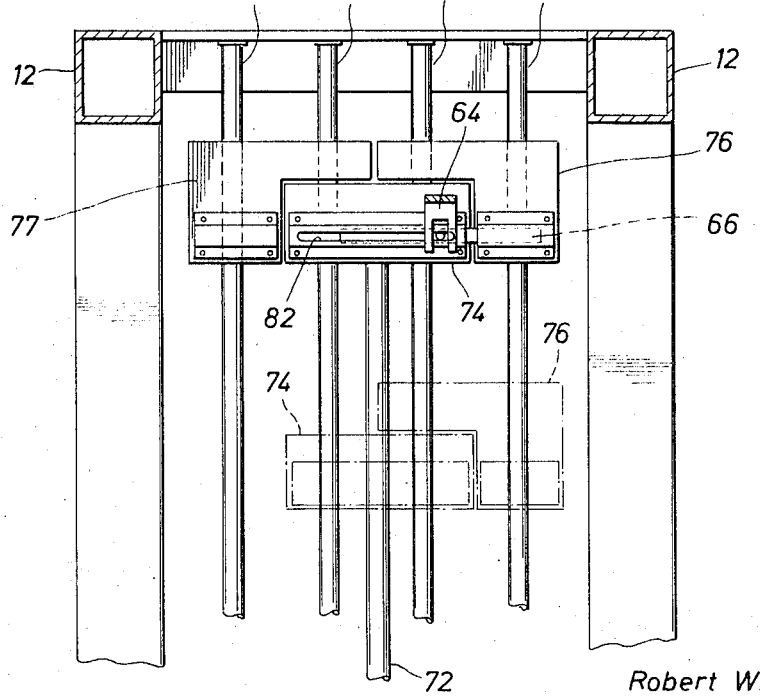
FIG. 7 is a sectional view taken along the line 7 — 7 of FIG. 6 showing a reciprocating mechanism which assists the apparatus first utilizing the left loading tray and then the right loading tray.

Briefly, the transversely extending plate 58 carries a downwardly projecting tab 64 shown in FIG. 6. As shown in FIG. 7, the tab 64 incorporates incorporates a U-shaped member which functions somewhat as a cam. It will be noted in FIG. 7 that the member 64 is open on a side pointing along the length of the packaging machinery. The U-shaped member is a cam which guides or controls the position of a vertically extending cam follower 65. The follower 65 is best shown in FIG. 6. It protrudes upwardly into the tab 64. As shown from the top view of FIG. 7, the follower 65 is perpendicular to an elongate bar member 66. The bar-like member 66 serves as a lock in the manner to be described. As the plate 58 reciprocates to he left and right in FIG. 6, it carries with it the cam 64. The cam 64 controls the location of the cam follower 65 and hence, moves the lock 66 to the left and right for purposes to be set forth.

In FIG. 7, the numerals 67 and 68 indicate a pair of guide bars which extend along the equipment. The numerals 69 and 70 indicate additional guide bars which are parallel. The four guide bars are shown in side view in FIG. 1. The several guide bars are parallel to the path of movement of the piston rod 72 of a long stroke hydraulic cylinder 73. As shown in FIG. 1, the left hand end of the double acting hydraulic cylinder 73 is pivotally connected to the left extreme end of the framework 11 and the right hand end of the piston rod 72 is pivotally connected beneath a traveling block mechanism 74. The traveling block 74 is best shown in FIG. 6. In FIG. 6, it will be noted that the piston rod 72 is on the lower side of the travelling block 74 which is slidably mounted on the guide rods 67 and 68. Thus, as the hydraulic cylinder 73 is actuated, the piston rod 72 retracts and extends moving the traveling block 74 along with it. As viewed in FIG. 1, the stroke of the piston rod 72 is approximately equal to one-half the length of the equipment. The stroke is more particularly tailored to the quantity or length of product to be packaged. More will be noted concerning this hereinafter.

Returning again to FIG. 6 of the drawings, the traveling block 74 is shown locked to the right hand traveling block 76. There is a similar left hand traveling block 77. The traveling blocks 76 and 77 are mounted on the outboard guide bars 70 and 69, respectively. The cam follower 65 is to the right as viewed in FIG. 6, and hence, the lock 66 is moved to the right. In FIG. 6, a tubular housing 79 is mounted on the traveling block 74 for receiving the lock bar 66. The traveling block 76 likewise incorporates a tubular housing 80. The left hand traveling block is provided with the tubular housing 81. As shown from above in FIG. 7, the three tubular housings 79, 80 and 81 align with one another in the fully withdrawn or unreciprocated position. This permits the lock bar 66 to slide to the right as viewed in FIG. 7, or to the left to engage the traveling block 74 with one of the two additional traveling blocks. It will be noted that the tubular housing 79 is slotted at 82 in FIG. 7 to permit the cam follower 65 to project upwardly in a posture for engagement by the cam 64.

The cam 64 reciprocates to the left and right with the tray table mechanism. When it reciprocates to the right, it carries the cam follower 65 with it. This locks the traveling block 76 to the traveling block 74. The traveling block 74 is the only one of the three provided with a motive force. It is the only one connected to the double-acting hydraulic cylinder 73 shown in FIG. 1. Thus, when the hydraulic cylinder is actuated, the traveling block 74 always reciprocates, but it alternatively carries with it one of the two traveling blocks 76 and 77.

The slot between the rail members 49 and 50 and the adjacent framework was previously emphasized. In FIG. 6, a mounting arm 84 on the right and a similar or symmetrical mounting arm 85 on the left are used to clear the stored product on the trays 37 and 38 for purposes of loading. The tray 38 is presumed to be loaded with product in FIG. 6. The mounting arm 84 is at its back-most or retracted position which is better appreciated in FIG. 2. In FIG. 2, the arm 84 is shown extending in the bent manner of FIG. 6 in alignment with the tray 38. A rather lengthy bumper 86 is carried on the arm 84. A lengthy bumper 87 is found on the arm 85. The bumpers 86 and 87 are symmetrical in construction. They are somewhat lengthy to permit them to push all of the product on the loading trays 37 and 38 into the open bags. This requires that the bumpers 86 and 87 actually enter into the bags in the preferred embodiment. For this reason, they are made somewhat elongate as best shown in FIG. 2.

Returning to FIG. 6, it will be observed how the traveling block 74 carries with it one of the two adjacent traveling blocks 76 or 77, and it will be further appreciated how the movement of the traveling blocks carries with it one of the bumpers for loading the product in one of the two loading trays 37 or 38.

Attention is next directed to FIG. 3 of the drawings. The loading tray 38 is shown in FIG. 3 as extending to a point over the transversely extending structural frame member 61 previously identified with respect to FIG. 2. It will be recognized in FIG. 3 that a slight span of open space exists between the ends of the tray 38 and the open bag 18. The apparatus carries with it a stuffing horn mechanism which aligns the product and which further spans the gap to place the product within the open containers or bags 18. This is more particularly understood by noting that the trays 37 and 38 are carried on the transversely extending members 58 and 60 previously illustrated with respect to FIG. 2. The numeral 88 identifies a support plate beneath the trays 37 and 38. The plate 88 is likewise indicated in section in FIGS. 4 and 6, as it extends between the two transversely extending members 58 and 60. In any case, the plate 88 is located beneath the loading trays 37 and 38. It is a suitable point of support for an upstanding tabular member 89 shown in FIG. 3 which is connected to the rear end of a hydraulic cylinder 90. The cylinder 90 carries a piston rod 91 which extends to a pair of oversized encircling collars 92 and 93. The collars 92 and 93 extend about the trays 38 and 37, respectively. They are spaced just from the trays on the bottom side as best shown in FIG. 4. They extend over the trays. The openings through the collars 92 and 93 are contoured to approximate the cross sectional shape of the product to be packaged. In the preferred embodiment, the product is round, and hence, circular openings are drilled in the collars 92 and 93.

The collars 92 and 93 provide a mounting for a multileafed beryllium copper set of stuffing horns as best indicated by the numerals 94 and 95. The stuffing horns 94 and 95 are formed of flexible spring-like material, and several fingers are incorporated in each of the stuffing horns.

The stuffing horns 94 and 95 are located above the pair of trays as shown in FIG. 4. There is no need for them to fully encircle the pair of loading trays. However, they are preferably found in the upper one-half to inscribe an arc of about 180°, all located above each of the feeding trays. The horns are preferably formed of a number of leaves which are separable and which are bent to the illustrated shape. They deflect on passage of a product therethrough.

The entire assembly is movable in response to the hydraulic cylinder 90. The cylinder 90 extends with the piston rod 91 being guided through an eyelet 96 best illustrated in FIG. 3. This carries the ring-like members 92 and 93 to a point about even with the end of the loading tray so that the stuffing horns extend beyond the trays into the open bags. It will be recognized that the tab 20 shown in FIGS. 3 and 5 prevents the product from dropping short of the bag should such a tendency arise.

Both the stuffing horns 94 and 95 move forward together on each operation. However, only one is indexed for loading a particular open bag as shown in FIG. 4. The other moves forward to a space between the pair of open bags. Of course, this movement is of no particular consequence inasmuch as there is no product on the tray behind the stuffing horn, and the equipment does not reciprocate to clear the particular loading tray.

Figure 8:
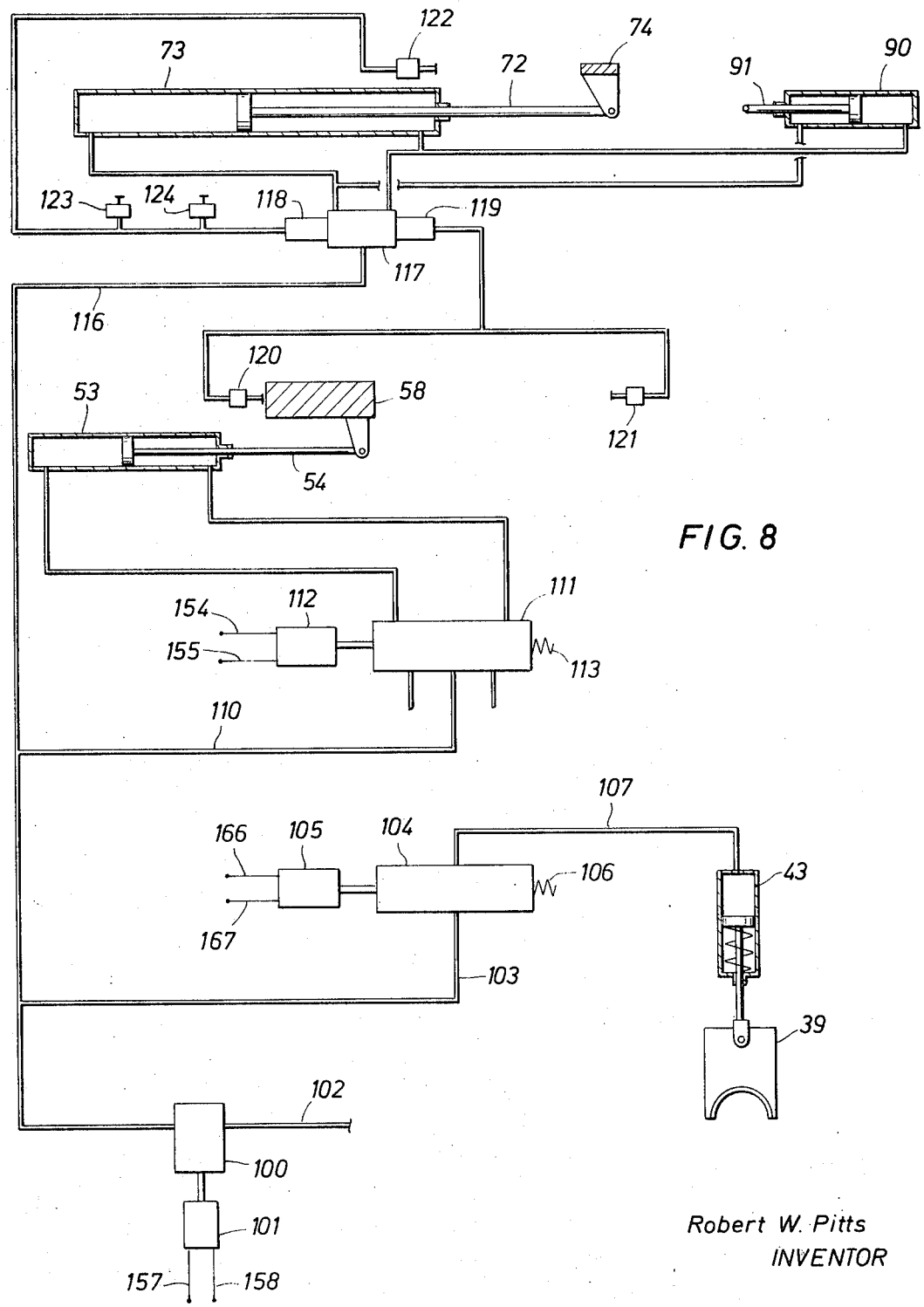
FIG. 8 is a pneumatic schematic showing the valving and various pneumatic operators which implement the present invention.

Attention is next directed to FIG. 8 of the drawings. The numeral 100 indicates a solenoid valve which is operated by a signal applied to a valve operator 101. The signal is preferably electrical as will be described hereinafter. The valve 100 is connected in a hydraulic line 102. The line 102 extends from some source such as a source of hydraulic fluid or pneumatic pressure. As will be recognized, the apparatus can function with either pneumatic or hydraulic power sources, but pneumatic operation is preferred.

The line 102 passes through the valve 100 and a conduit 103 is communicated with a spring return valve 104. The valve 104 is controlled by an electric operator 105 while a spring 106 returns it to its original posture. The operator 105 connects the conduit 103 to an additional conduit 107 which is supplied to the cylinder 43 which moves the gate 39. Thus, when the operator 105 is operated, the gate 39 is forced downwardly. The spring 106 returns the valve 104 to its non-operated position. The spring within the hydraulic cylinder 43 returns it to the up position, thereby opening the gate 39.

A tubing 110 supplies pressure to a valve 111 which is controlled by a valve operator 112, but which is also returned to its centered position by a return spring 113. The valve 111 supplies fluid to the double-acting hydraulic cylinder 53. As mentioned before, the cylinder 53 moves the tray table through its connection to the end plate 58 shown in FIG. 6.

A supply line 116 supplies fluid to a four-way bleed control valve 117. Two bleed operators 118 and 119 are connected to the valve 117. The bleed operator 119 is particularly controlled by movement of the tray table. A pair of automatic recycling poppet valves 120 and 121 determine when the table has moved to the extremity of its stroke. They determine when the table is in registry, positioning one of the loading trays 37 or 38 in line with the trough 35 which feeds the products onto the loading tray. The valves 120 and 121 provide a signal to the bleed operator 119 which manipulates the valve 117. The bleed operator 118 is connected with an additional poppet valve 122 which is located at the position shown in FIG. 3. The poppet valve 122 determines retraction of the largest cylinder 73 which reciprocates the entire mechanism along the length of the packaging machine. The traveling block 74 depresses the valve 122 to form the necessary fluid signal for the valve operator 118. This, of course, reverses the opening in the valve 117.

The valve 117 is connected to operate the hydraulic cylinder 73. The cylinder 73 is made double acting as shown in the drawings. Its retraction is initiated by the operator 119. Its retraction is terminated by operation of the poppet valve 122 and extension is started. The cylinder 73 extends until the traveling block 74 returns to its original full line position of FIG. 7. It should be recalled that it carries with it on each trip one of the adjacent traveling blocks 76 or 77. The arrival of the alternately moved traveling block is sensed by additional poppet valves 123 and 124 which are connected in common with the valve 122. The valves 123 and 124 are located adjacent to the control rods 69 and 70 at the far right hand end of the equipment. Thus, they sense return of the traveling blocks 76 and 77 as shown in FIG. 6.

The hydraulic cylinder 73 is thus initiated in operation by arrival of the tray table at one of the two extreme positions. This makes it dependent on the beginning of operation which is controlled by the electrical operator 112. It is terminated in operation by the valves 123 and 124 which sense return of the traveling blocks after their full cycle of movement.

The cylinder 73 is connected in parallel with the cylinder 90. It will be recalled that the cylinder 90 extends the stuffing horns 94 and 95 into the bags. The relative sizes of the two should be considered. They cylinder 73 in the preferred embodiment has a stroke in excess of four feet while the cylinder 90 has a stroke of just a few inches. The cross sectional area is much smaller. It will be appreciated that parallel connection of the two is permissable inasmuch as the cylinder 90 fully extends well before the cylinder 73 completes its movement. Considering the mechanics of the operation, this means that the stuffing horns associated with the filled tray are positioned in the open bag 18 in the manner shown in FIG. 3 long before the product is forced through the stuffing horns and into the bag. It will be noted that the long stroke of the cylinder 73 carries the ram 86 or 87 the full length of the equipment, which is a substantial stroke. Likewise, on reversal, the stuffing horns are withdrawn quickly while the rams are withdrawn.

Figure 9:
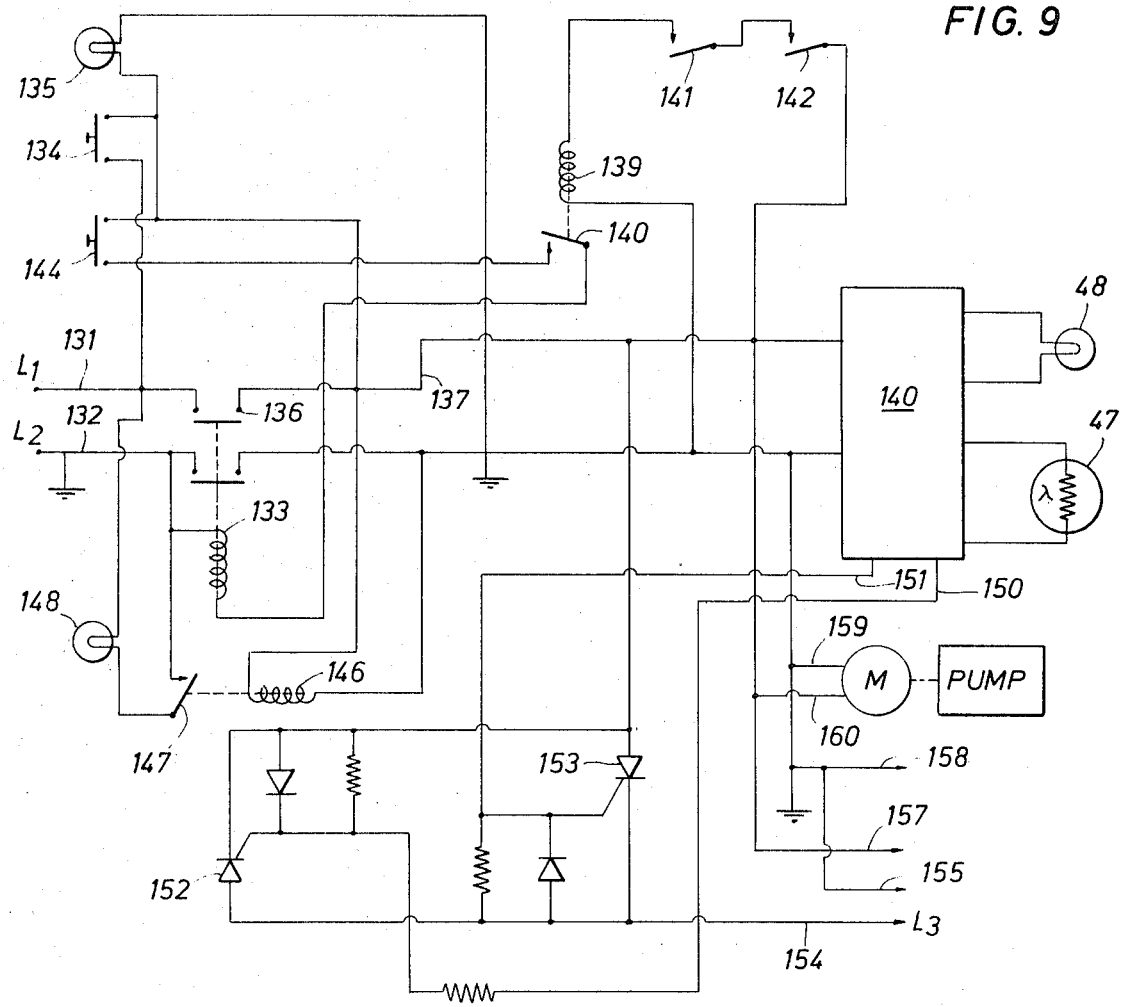
FIG. 9 is a partial schematic of the electrical wiring diagram of the present invention; and, FIG. 10 shows additional circuitry for the operation of the present invention.

Attention is next directed to FIG. 9 of the drawings. It provides control circuitry as will be described for operating the electrical operators 101, 105, and 112, shown in FIG. 8. The power conductors 131 and 132 are illustrated in FIG. 9 connected with a relay 133. The numeral 134 indicates a start button, while the numeral 135 is a pilot light indicating the "on" condition of the equipment. When the button 134 is suppressed, it provides power from the conductor 131. The conductor 131 is communicated through the contacts 136 of the relay to a conductor 137 to energize the counter electronics indicated generally at 140. The relay is opened by a timing relay 139 having the contacts 140 best illustrated in FIG. 9. The timing relay 139 functions to shut down the machine if the bags 18 are not opened. Bag opening is sensed by the upward movement of the tubular members 30 into the bag opening mechanism 24. This position indication is provided through the use of a pair of microswitches 141 and 142. If the microswitches are closed, the relay does not time out. The relay 139 is thus opened after passage of a selected interval, approximately 6 seconds. If the relay does time out, this signifies the need to reload the bags or to otherwise service the equipment.

A stop button 144 is connected to the relay 133. If the stop button 144 is pressed, it opens the same circuit as the operation of the relay 139. Both deprive the armature of the relay 133 of power which opens the relay 133.

The numeral 146 indicates an additional relay which is energized when the relay 133 closes the contacts 136. The relay 146 opens a pair of contacts 147 in conjunction with a series pilot light 148 with the contacts 147 connected across the conductors 131 and 132. The relay 146 provides a holding action in the "on" condition. That is to say, the contacts 147 are separated. The reason for this is that the relay 133 operates only momentarily.

The counter circuitry incorporates the lamp 48 and photocell 47 previously discussed. The counter circuitry is preferably a bought item. It counts the pulses from the photocell 47. It is preferably adjustable to count to a predetermined or set level. In the preferred embodiment, the count might run as high as three or four hundred. The counter preferably includes a set count mechanism and a register which stores the pulses created by the photocell 47. When the register matches the set count, it provides an output signal on a pair of conductors 150 and 151. The conductors 150 and 151 provide control signals for silicon control rectifiers 152 and 153, respectively. The silicon control rectifiers 152 and 153 fire to provide a signal on a conductor 154. The conductor 154 is paired with a conductor 155 which is a ground. The ground 155 provides a return for the current flowing in the conductor 154. It will be noted that the silicon control rectifiers 152 and 153 are, in effect, parallel to one another. The signals on the conductors 150 and 151 are from a flip-flop. Thus, on each operation, one goes sufficiently positive to cause the gate of one of the two silicon control rectifiers to trigger. From the foregoing, it will be understood that one of the two silicon control rectifiers is fired on each cycle and provides a surge of current in the conductor 154. The conductors 154 and 155 are supplied to the electrical operator 112 which manipulates the valve 111 to control the cylinder 53 which reciprocates the tray table. It will be appreciated that this is initiated on the accumulation of the preset count in the register within the electronics counter 140. When the count is achieved, the table is moved by applying the signals through the conductors 155 and 154 to the valve 111 illustrated in FIG. 8.

The numerals 157 and 158 in FIG. 9 provide control signals for the electrical operator 102. This is shown in FIG. 8. When the equipment is first turned on, the conductors 159 and 160 turn on an electric motor which is connected to a vacuum pump for operation of the bag opening mechanism.

Figure 10:
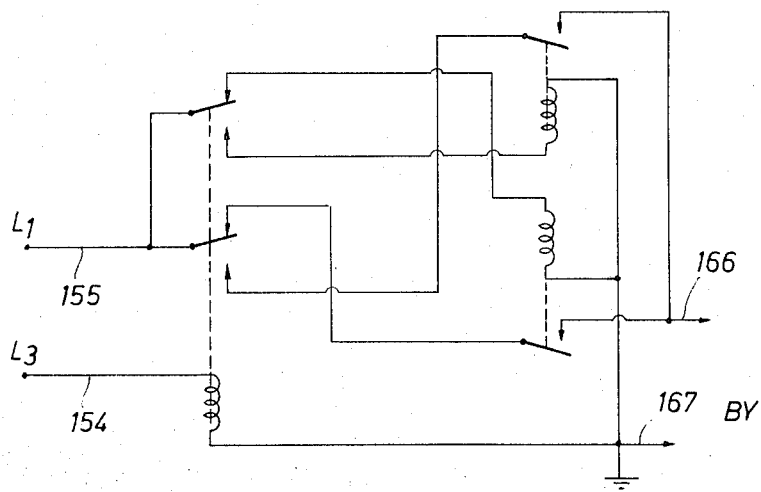

Attention is momentarily directed to FIG. 10 of the drawings. The conductors 154 and 155 are input to FIG. 10. It will be recalled that the signal on these two conductors is a signal indicating that one of the trays has been filled and that the count of product on the tray is maximum. When this signal is given, the tray table is indexed from one position to another. Likewise, the gate cylinder 43 shown in FIG. 8 is operated. The signals input to the conductors 154 and 155 are output on the conductors 166 and 167 which are applied to the electrical operator shown in FIG. 8. This operator provides fluid to the cylinder 43 which lowers the gate 39. A double pole, double throw relay and a pair of single pole, single throw relays are connected between the conductor 155 and the output conductor 166 to control the polarity of the signal provided to the electric valve operator 105 shown in FIG. 8.

It might be profitable to go through a detailed description of the operation of the present invention. On the other hand, it is believed that each of the various subassemblies has been explained hereinbefore. The cooperation of the several subassemblies to package the product is believed readily apparent. It will be noted that the product is introduced on the tray 35 to the equipment. The product travels along the tray from its source, but is counted by the cooperative lamp 47 and photocell 48 mounted in the posture of FIG. 6. When the counter electronics 140 reaches the preset count, signals are given to initiate a loading operation. A signal is formed which operates the control valve for the cylinder 43 which lowers the gate 39 as shown in FIG. 6. This prevents further product from moving along the trough 35 into the filled tray. A signal is likewise formed which controls the electrical operator 112 which opens the valve 111 and actuates the cylinder 53 for moving or indexing the tray table. The tray table is indexed to the other position. When the tray table arrives at the extremity of its movement, it contacts either of the poppet valves 120 or 121 shown in FIG. 8. When the poppet valve is actuated, the valve 117 is opened to start the long stroke of the machinery. When the valve 117 is opened, the small cylinder 90 extends the stuffing horns for both trays. The long cylinder 73 retracts and carries with it the traveling block 74. The traveling block 74 picks up one of the two adjacent traveling blocks 76 or 77 through the mechanical interlock system shown in FIGS. 6 and 7. As the two travel together, one of the two rams 86 or 87 drives the produce off the tray into the open bag through the stuffing horn at the end of the tray. The open bag is filled since the stroke is preferably long enough to push the filled bag and product to the left as viewed in FIG. 3 to free the bag of the tab 20 and to push the bag off the equipment. The bag is preferably handled through the means of a conveyor system or the like on both sides of the machinery. The traveling block 74 bottoms out on the poppet valve 122 which reverses the operative status of the bleed control valve 117 and causes the cylinder to extend its piston rod 72 to return the traveling block 74 to the illustrated position of FIG. 7. This, then, completes the loading stroke and returns the equipment. Well prior to this, the gate 39 is raised by removing the fluid power to the cylinder 43. This permits the continued counting of additional product on the tray which was empty.

After the loaded bag has been kicked from the table, the particular bag opening vacuum shoe which had engaged the bag falls down and picks up the top film or paper layer of the next bag in the stack. The tubular member 30 shown in FIG. 3 rises once the bag is picked up and opened. It will be recalled that the other of the two duplicate heads remain with an open bag at all times during the cycle just described.

The foregoing description is only of one cycle of operation. Inasmuch as the equipment reciprocates left and right, it will be understood that some of the equipment is used alternatively. For instance, the bags are filled alternately on the left and the right. Likewise, the traveling blocks 76 and 77 reciprocate alternately. The tray table is positioned to the right or to the left, in alternate sequence.

While the foregoing is directed to the preferred embodiment, the scope of the present invention is determined by the claims which are appended hereto.

What is claimed is:

1. A packaging machine comprising:
   a pair of product receiving trays adapted for selectively receiving a product thereon to be packaged;
   bag storage means adapted to receive and hold a plurality of closed bags;
   bag opening means operatively positioned with respect to a plurality of bags held by said bag storage means;
   means for aligning one of said pair of trays with an opened bag;
   means for moving along said one aligned tray and continuing its movement to insert product therefrom into such opened bag;
   said moving means being thereafter retracted to a neutral position;
   said aligning means thereafter aligning the other of said trays for subsequent bagging of product thereon;
   an overhead support structure above said bag storage means;
   said bag opening means being mounted thereon and positioned above a pair of stacks of closed bags supported by said bag storage means;
   said bag opening means further including a vacuum shoe having openings in the lower face thereof above a stack of closed bags;
   an elongate vertically extending tubular member connected to said vacuum shoe and hollow therethrough;
   a second tubular member fixedly supported by said overhead support means and telescoped with said first tubular member in a manner permitting sliding movement therebetween and being closed at all points to air flow therethrough except an inlet which is adapted to be connected with a source of vacuum flow;
   said vacuum shoe and first tubular member being drawn by vacuum flow upwardly into said second tubular member to lift and open the topmost of one of the stack of closed bags; and,
   stuffing horns slidably mounted and movable between first and second positions, one of the two positions being slightly inserted into the opening of the opened bag which is lifted by vacuum flow by said vacuum shoe means and aligned with said moving means and said aligned tray to permit insertion of product into the opened bag.

2. The invention of claim 1 including:
   a. a trough adapted to be connected with a source of product;
   b. a gate means aligned with said trough for periodically closing same to continued passage of product thereon;

c. counter means for measuring the quantity of product passing said gate and operative to periodically close said gate means;

d. said trough being positioned with respect to said pair of trays to feed product thereto in selected quantities; and, e. said aligning means positioning first one and then the other of said trays to receive a selected quantity through said gate means on to said trays.

3. The invention of claim 2 wherein said gate means is positioned apart from said tray and is selectively moved into a position blocking said tray against further movement.

4. The invention of claim 1 wherein said trays are mounted on a rectangular frame which includes:
a. a pair of parallel guide means extending laterally of said frame;
b. a pair of spaced parallel supports received by said guide means for limiting movement across said packaging machine;
c. fluid operated motive means connected to said frame and operable to move said frame between two positions; and,
d. control means for limiting the range of movement of said frame such that one or the other of said trays is aligned with a selected position to receive product thereon.

5. A Packaging machine comprising:

a pair of product receiving trays adapted for selectively receiving a product thereon to be packaged;

bag storage means adapted to receive and hold a plurality of closed bags;

bag opening means operatively positioned with respect to a plurality of bags held by said bag storage means;

means for aligning one of said pair of trays with an opened bag;

means for moving along said one aligned tray and continuing its movement to insert product therefrom into such opened bag;

said moving means being thereafter retracted to a neutral position;

said aligning means thereafter aligning the other of said trays for subsequent bagging of product thereon;

a trough adapted to be connected with a source of product;

a gate means aligned with said trough for periodically closing same to continued passage of product thereon;

said trough being positioned with respect to said pair of trays to feed product thereto in selected quantities;

a supportive frame connected to said pair of trays;

means for periodically reciprocating said frame laterally to receive product from said trough;

motive means periodically operable for movement along the length of said apparatus;

said moving means being connected to said motive means for periodically clearing said one tray of product;

a traveling block moved by said motive means;

means for guiding said block in its movement;

a pair of additional traveling blocks;

means for selectively connecting said first traveling block to said additional blocks for movement therewith;

said moving means including a pair of elongate rams in an aligned position for movement along said pair of trays; and, said rams being moved by said additional traveling blocks.

6. The invention of claim 5 including:
a. a slidable pin on said first traveling block;
b. receptacle means in each of said additional blocks for receiving said pin; and,
c. means carried on said frame for reciprocating therewith and for movement of said pin to engage first one and then the other of said additional traveling blocks.

7. The invention of claim 6 including guide means for said additional traveling blocks aligned for movement with said first block.

8. The invention of claim 1 wherein said bag opening means is duplicated, one above the first stack of closed bags in said bag storage means and the other above the second stack of bags in said bag storage means.

9. The invention of claim 1 wherein said stuffing horns include:
a. a generally horizontally extending hydraulic cylinder having a piston rod;
b. a generally encircling structure aligned with the end of one of the pair of said product receiving trays when loaded with product thereon, said encircling structure being located at one end thereof and having a central opening for receiving the product therethrough;
c. at least a pair of inwardly directed and angularly positioned flexible blade-like members supported by said encircling structure but directed at an angle away from said product receiving tray and toward or into a bag opened by said bag opening means; and,
d. said hydraulic cylinder being connected to said stuffing horns for reciprocating same from a first position to a second position, one of said positions being withdrawn from the position of an open bag in said bag storage means and the other of said positions inserting at least a portion of said stuffing horns into the topmost and open bag.

10. A packaging machine comprising:

a pair of product receiving trays adapted for selectively receiving a product thereon to be packaged;

bag storage means adapted to receive and hold a plurality of closed bags;

bag opening means operatively positioned with respect to a plurality of bags held by said bag storage means;

means for aligning one of said pair of trays with an opened bag;

means for moving along said one aligned tray and continuing its movement to insert product therefrom into such opened bag;

said moving means being thereafter retracted to a neutral position;

said aligning means thereafter aligning the other of said trays for subsequent bagging of product thereon;

said aligning means including:
a pair of parallel transversely extending guide means, perpendicular to said trays;
a pair of spaced parallel supports received by said guide means and connected with said tray means for sliding thereon and moving as a unit therewith to position said tray means at selective and alternating positions with respect to said bag opening means;

motive means connected to said joined trays and pair of parallel supports and operable to move them as a unit between first and second positions;

framework for supporting the packaging machine and extending on both sides of said pair of trays and being sufficiently spaced therefrom to permit said trays to move between said first and second positions without interference from said framework and defining a pair of elongate slots along the length thereof on opposite sides;

said moving means including a horizontally directed cylinder having a piston rod which is extendible and retractable parallel to and beneath said product receiving trays; and, supporting structure extending from said cylinder to said moving means and being duplicated and symmetrically located in left and right slots adjacent to said product receiving trays and being slidably movable along the length of said trays to carry said moving means therewith, there being a pair of moving means with each operable to be aligned with one of said product receiving trays when loaded and movable for a predetermined length or distance therealong to force product from said tray and into an open bag.

11. A packaging machine comprising:

a pair of product receiving trays adapted for selectively receiving a product thereon to be packaged;

bag storage means adapted to receive and hold a plurality of closed bags having a greater lengthwise dimension;

bag opening means operatively positioned with respect to a plurality of bags held by said bag storage means;

means for aligning one of said pair of trays with an opened bag and along the greater dimension thereof;

means for moving along said one aligned tray and continuing its movement to insert product therefrom into such opened bag along the greater dimension thereof;

said moving means being thereafter retracted to a neutral position;

said aligning means thereafter aligning the other of said trays for subsequent bagging of product thereon; and, means for moving the filled bag from its original position as determined by said bag storage means to disengage the filled bag from said bag storage means.

12. The apparatus of claim 11 wherein said moving means has a stroke sufficient to insert product into the opened bag and thereafter push the filled bag along its greater dimension.

13. The apparatus of claim 11 including:

a trough adapted to be connected with a source of product;

a gate means aligned with said trough for periodically closing same to continued passage of product thereon;

counter means for measuring the quantity of product passing said gate and operative to periodically close said gate means;

said trough being positioned with respect to said pair of trays to feed product thereto in selected quantities; and, said aligning means positioning first one and then the other of said trays to receive a selected quantity through said gate means on to said trays.

* * * * *